Figures 1, 2:
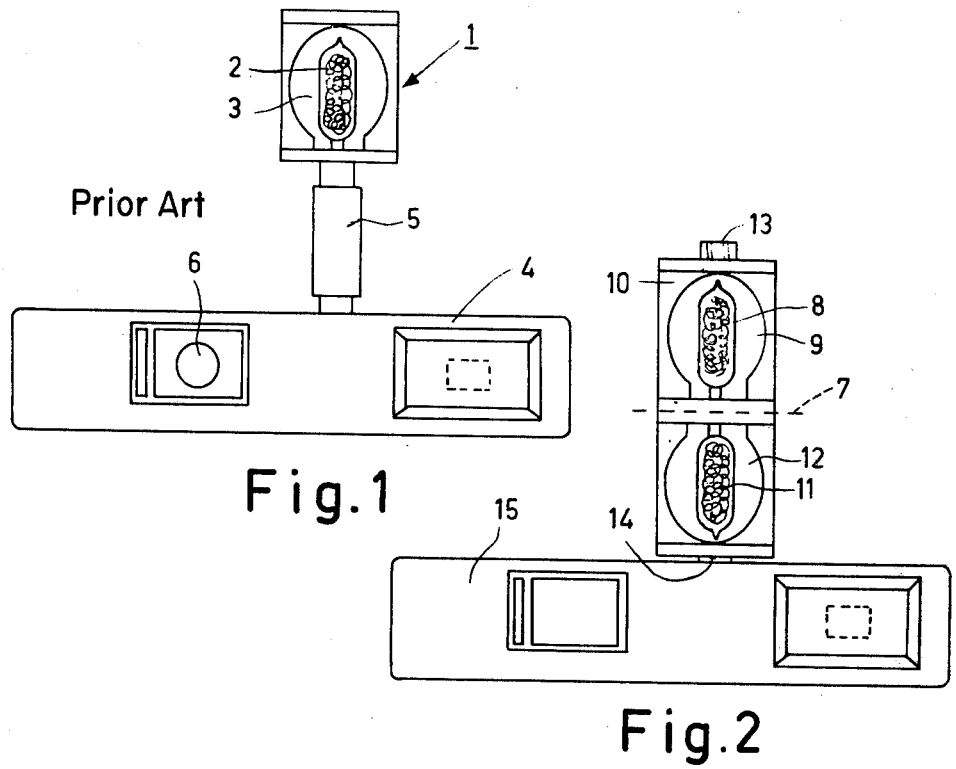

United States Patent [19]

Witterick et al.

[11] 4,059,387
[45] Nov. 22, 1977

[54] FLASH LAMP UNIT

[75] Inventors: Petrus Johannes Julius Witterick; Joannes Henricus Franciscus Sieben, both of Eindhoven, Netherlands

[73] Assignee: U.S. Philips Corporation, New York, N.Y.

[21] Appl. No.: 668,944

[22] Filed: Mar. 22, 1976

[30] Foreign Application Priority Data

Apr. 14, 1975 Netherlands .......................... 7504397

[51] Int. Cl.² .......................... F21K 5/02; G03B 15/02
[52] U.S. Cl. ......................................... 431/93; 362/11
[58] Field of Search .................... 431/92, 93, 94, 95, 431/95 A; 240/1.3; 354/142

[56] References Cited

U.S. PATENT DOCUMENTS

| 3,619,590 | 11/1971 | Muelemans et al. | 431/92 |
| 3,941,992 | 3/1976 | Blount et al. | 431/95 A |

Primary Examiner—Carroll B. Dority, Jr.
Attorney, Agent, or Firm—Frank R. Trifari; Robert S. Smith

[57] ABSTRACT

A flash lamp unit having two connection members which are present on opposing surfaces of the unit and are each suitable for being coupled to a camera. The unit further comprises two series of flash lamps having associated reflectors, one series of flash lamps being arranged nearest to one surface and the other series being arranged nearest to the other surface. Each series of flash lamps can only be flashed by a cooperation between the connection member remote from that series.

3 Claims, 11 Drawing Figures

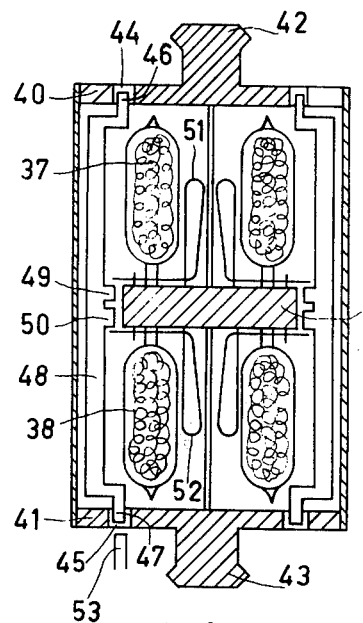
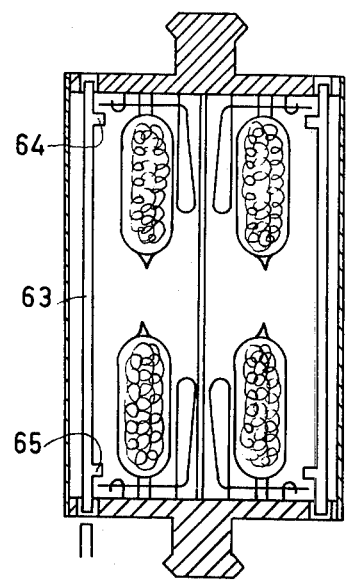
Fig.5    Fig.6
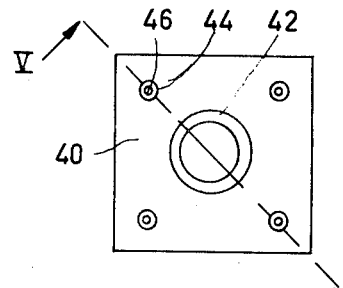
Fig.4
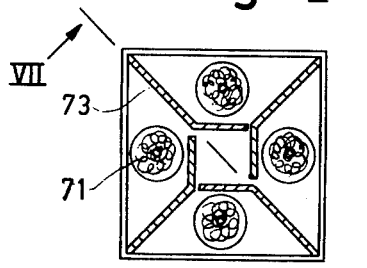
Fig.8
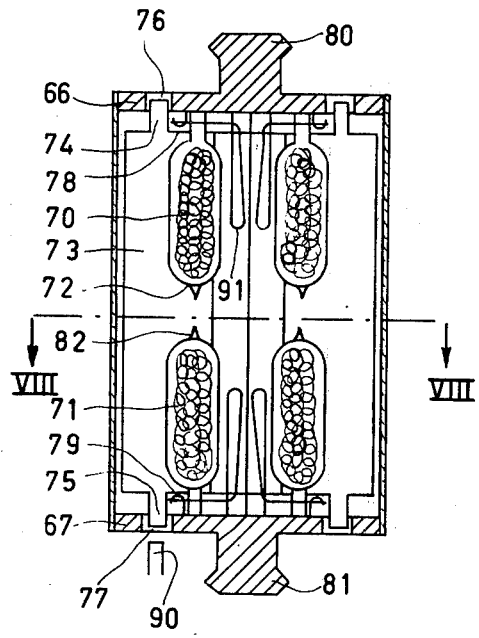
Fig.7

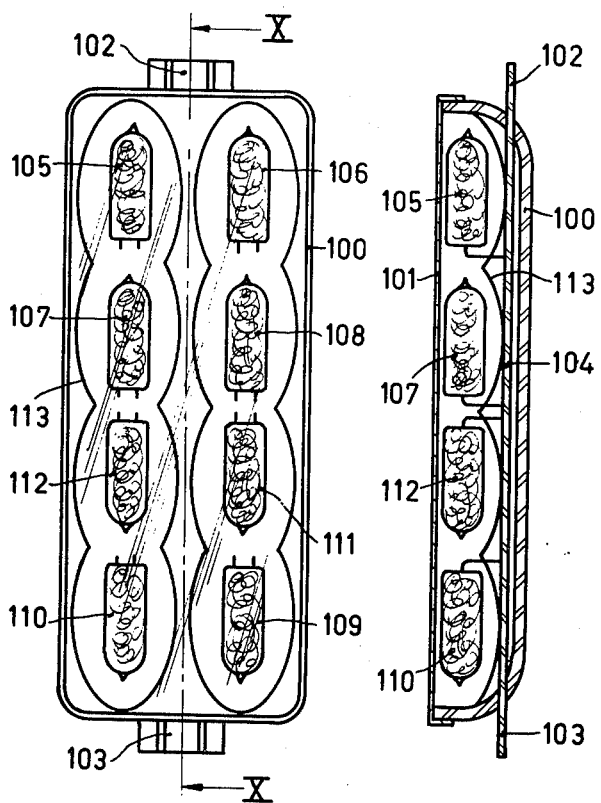
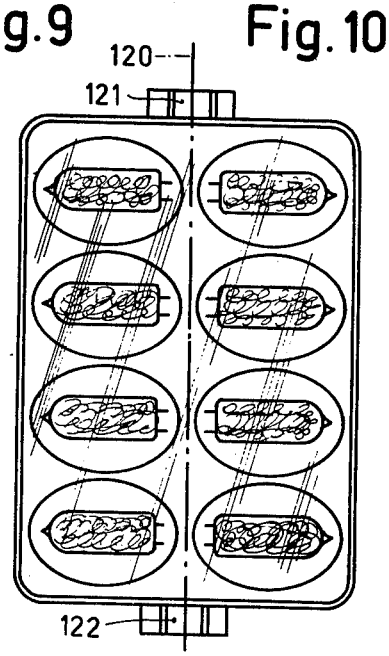
Fig. 9   Fig. 10
Fig. 11

FLASH LAMP UNIT

The invention relates to a flash lamp unit comprising two connection members which are present on opposite surfaces of the unit and are each suitable to be coupled to a camera, said unit comprising two series of flash lamps having associated reflectors, a series of flash lamps being arranged nearest to one surface and the other series being arranged nearest to the other surface, each lamp being ignitable by a pulse suppled via one of the connection members. A connection member is to be understood to mean herein a mechanical coupling member with which the unit is secured to a camera, as well as the means present on or near said coupling member for supplying the electrical or mechanical pulses from the camera. Such a flash lamp unit is known from the U.S. Pat. No. 3,619,590.

The known flash lamp unit is constructed as a stepwise rotatable unit which can be coupled to a camera. The unit is secured in a suitable holder of the camera by means of one of the connection members. Said camera is constructed so that, for example by operating the shutter mechanism a member present in the camera produces an electric pulse which is transferred to the flash lamp unit via the connection member. Said unit can be coupled electrically to the camera in such manner that all the flash lamps of the series present nearest the camera can be fired one after the other without it being necessary for the flash lamp unit to be decoupled from the camera. After said series of lamps has been fired, the unit is decoupled and turned and recoupled to the camera upside down.

The known flash lamp unit is not suitable as such for use on a modern pocket camera. In the coupled condition the distance from a flash lamp of the unit to be fired and the lens of the pocket camera is so small that photographs made with said combination show the known "red eyes" effect.

It is an object of the present invention to change the known flash lamp unit in such manner that a flash lamp unit is obtained in which the above-mentioned drawback does not occur.

For that purpose, the flash lamp unit according to the invention is characterized in that the flash lamps of the same series can be flashed via the connection member present nearest to the other series. Said flash lamp unit has the advantage that in the coupled condition on a camera only that series of flash lamps can be fired which is farthest remote from the camera. The distance between a lamp to be flashed and the lens of the camera thus becomes sufficiently large so that the annoying "red eyes" effect is substantially negligible.

As a rule, the flash lamp unit according to the invention will comprise two oppositely located connection members, the flash lamps being arranged so that a series of flash lamps is arranged on either side of a plane extending at right angles to the connection line of the two members and each series of flash lamps can be flashed by a pulse supplied to the unit via the farthest remote connection member.

It is to be noted that it is known per se when using a flash lamp unit on a pocket camera to increase the distance between a flash lamp and the lens by a spacing member which is arranged temporarily between the flash almp unit and the camera. A drawback of the use of a spacing member is that the photographer has to place two separate objects on his camera, which is a time-consuming job. A further drawback of the use of a spacing member is that the pulse from the camera is transmitted only indirectly to the flash lamp unit. As a result of this the reliability of the combination camera-flash lamp unit is unfavourably affected.

Starting from the above-described construction, several modified embodiments of the flash-lamp unit according to the invention are possible.

A first embodiment of the flash lamp unit is characterized in that between the two connection members a number of members extend which can each be moved in two opposite directions, each member being capable of unlocking a percussion spring in each direction of movement. In the coupled condition on the camera the flash lamp unit according to this embodiment can be reached by a pin emanating from the camera. For firing a flash lamp, said pin penetrates into the unit and hits one of the members there. As a result of this, said member moves in its longitudinal direction over a given distance and unlocks the percussion spring which is to fire a flash lamp of the series farthest remote from the camera. An advantage of this embodiment is that after turning over the flash lamp unit the said members can be used for a second time, namely for unlocking the percussion springs belonging to the other series of lamps.

Each of the said movable members is preferably formed as a rod having at least two projections which are positioned on the rod in such manner that, after unlocking a percussion spring, the rod is in a position suitable for unlocking percussion spring belonging to the other series of flash lamps. The movable member may also be formed as a part of the reflector, which movable part, after unlocking a percussion spring, is in a position suitable for unlocking a percussion spring belonging to the other series of flash lamps. In this latter embodiment a multiple divided reflector is used in which the movable part of the reflector ensures the actuation of the percussion springs. Separate operating members are hence superfluous.

The invention may also be applied to flash lamp units in which piezo-electrically ignitable flash lamps are used.

An embodiment aiming at this purpose is characterized in that an electric circuit coupled to the connection members is incorporated in the housing of the unit, with which circuit the lamps of a series can be ignited sequentially by short applications of a high voltage. A circuit suitable for this purpose is described in U.S. Pat. No. 3,500,732.

A special embodiment thereof is characterized in that the unit is formed as a flat box which is transparent on at least one of its flat sides, a plate having an electric circuit and extending substantially parallel to the flat surfaces being present between the flat sides of the box, two series of sequentially ignitable flash lamps coupled to said circuit being arranged between one of the flat sides of the unit and the plate. The direction of radiation of all the lamps in this case is always oriented to the same direction.

In a further embodiment of the flashlamp unit according to the invention the two series of flash lamps are located with their longitudinal axes in one plane. Although, normally, the lamps will be arranged in two series of four lamps, the lamps of one series being present in one common zone parallel to the transparent side, the lamps are preferably arranged pairwise after each other taken from one surface in the direction of the second surface, each pair being present in a zone parallel to the transparent side. This embodiment results in an even further increase of the distance between the lens and the lamps to be flashed, so that the "red eyes" effect is fully avoided.

A special embodiment thereof is characterized in that the longitudinal axes of each pair of lamps are located parallel to each other or are coaxial.

Figure 3:
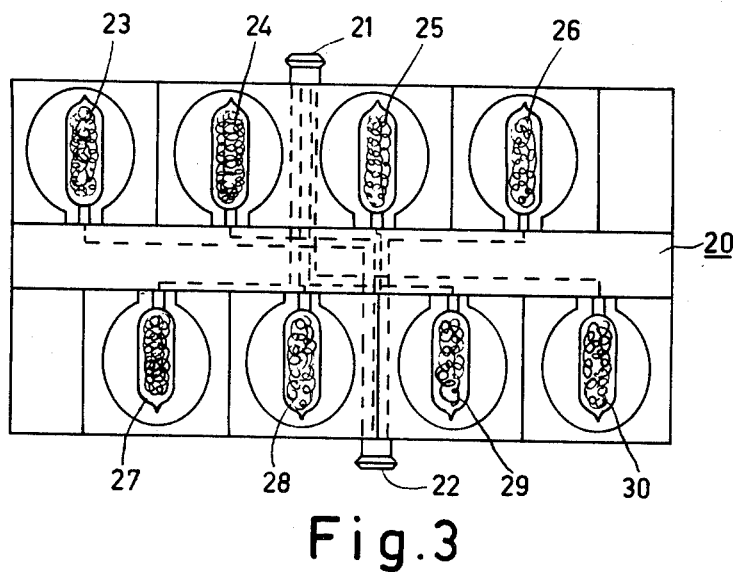

The invention will be described in greater detail with reference to a few embodiments and a drawing, in which FIG. 1 is a front elevation of a known flash cube which is coupled to a pocket camera through a spacing member, FIG. 2 is a front elevation of an embodiment of the flash lamp unit according to the invention coupled to a pocket camera, FIG. 3 is a front elevation of a flash lamp unit according to the invention comprising low-voltage flash lamps.

FIG. 4 is a plan view of a flash lamp unit according to the invention comprising percussion flash lamps, FIG. 5 is a sectional view taken on the line V—V of FIG. 4, FIG. 6 is the same sectional view taken on the line V—V of FIG. 4 of another embodiment, FIG. 7 is a sectional view taken on the line V—V of FIG. 4 of still another embodiment, FIG. 8 is a sectional view taken on the line VIII—VIII of FIG. 7, FIG. 9 is a front elevation of a flash lamp unit according to the invention comprising high-voltage flash lamps, FIG. 10 is a sectional view taken on the line X—X of FIG. 9, and FIG. 11 is a front elevation of another embodiment of the flash lamp unit comprising high-voltage flash lamps.

The flash lamp unit shown in FIG. 1 is a known flash cube 1 comprising a number of flash lamps 2 and associated reflectors 3. The flash cube cooperates with a pocket camera 4. A spacing member 5 is present between the camera 4 and the flash lamp unit 1. Said spacing member 5 ensures that a flash lamp 2 to be fired is present at a sufficient distance from the lens 6 of the camera. Without a spacing member, the distance between the flash lamp and the lens is so small that photographed persons have red eyes on the photographs.

FIG. 2 shows how a flash lamp unit according to the invention may be constructed. The flash lamp unit or assembly comprises two series of lamps which are arranged above each other in a manner as described in the U.S. Pat. No. 3,619,590. A first series comprises four lamps 8, having associated reflectors 9, and is present above the plane 7 as viewed in the drawing. Each of the lamps is adjacent a respective one of the side surfaces 10 of the unit. The second series also comprises four lamps 11, having associated reflectors 12, and is present below the plane 7. The unit furthermore comprises two connection members 13 and 14, plane 7 extending transversely to an imaginary line joining the connection members. In FIG. 2 the unit is coupled to a pocket camera 15 by means of the member 14. The lamps of the two series are each flashed by a pulse from a member (not shown) present in the camera. The unit according to the invention has such a construction that the pulse from the camera 15 will flash a lamp 8 of the series which is farthest remote from the camera and is in a position suitable for flashing. In the coupled condition, the flash lamp unit is stepwise rotatable relative to the camera. After flashing all the lamps 8, the flash lamp unit should be turned over and placed on the camera by means of connection member 13. The series of lamps 11 is then the more remote from the camera and may be flashed.

The type of flash lamp to be used for the flash lamp unit is determined by the type of camera with which the unit cooperates. Inter alia, three types of flash lamps are known, namely low-voltage flash lamps, percussion flash lamps and high-voltage flash lamps. To cater for these types of flash lamps, three constructions of the flash lamp unit according to the invention are provided.

In a first embodiment, the flash lamp unit comprises two series of low-voltage flash lamps. Such a unit may be constructed as is shown in FIG. 2, i.e. rotatable relative to the camera. The flash lamps 8 of one series are each connected to the connection member 14 by means of electric current conductors. The said member is of a known conventional type. The lamps are coupled thereby mechanically and electrically in the usual manner. The flash lamps 11 of the second series are connected to the member 13 by current conductors. The unit may alternatively be formed as is shown in FIG. 3. In this case it is a flat pack 20 which is secured to a camera by means of one of the connection members 21 or 22 so as to be non-rotatable. The pack 20 comprises two series of lamps 23, 24, 25, 26 and 27, 28, 29, 30. Each of the lamps 23 to 26 is connected to the connection member 22 by means of electric current conductors shown diagrammatically by broken lines. The lamps 27 to 30 are connected electrically to the connection member 21 by means of similar current conductors.

A second embodiment is shown in FIGS. 4 to 8.

FIG. 5 is a sectional view of a flash lamp unit according to the invention comprising percussion flash lamps. Said flash lamp unit comprises two series of percussion flash lamps which are arranged one above the other and of which two lamps, 37 and 38, respectively, of each series are shown in the drawing. Said flash lamps are secured to a plate-shaped member 39. Parallel to the plate 39 the unit comprises two plates 40 and 41 each having a respective connection member 42 and 43. Plates 40 and 41 are provided with corresponding pairs of apertures 44 and 45 disposed around the respective connection members. Each pair of apertures 44 and 45 accommodates the respective ends 46 and 47 of a rod-shaped member 48. This member has two projections 49 and 50. These projections each serve to unlock a respective percussion spring 51 and 52. In FIG. 5, the percussion spring 51, which is to fire flash lamp 37, is unlocked from behind a pin by movement of projection 49. The percussion spring 52 which cooperates with a flash lamp 38 is unlocked from its pin by movement of projection 50. The number of rod-shaped members is equal to the number of flash lamps of one series. In the coupled condition to a camera, a pin 53 emanating from the camera (not shown) will enter the unit via one of the apertures 44, 45 and strike one end of the rod-shaped member. The unit is constructed so that a pin 53 which penetrates into the unit via aperture 45 moves the rod-shaped member 48 upwards so that projection 49 unlocks the percussion spring 51. The percussion spring 51 then hits a percussion flash lamp 37 as a result of which the latter ignites. The flash unit according to this embodiment is stepwise rotatable relative to the camera. After firing a flash lamp 37, a next flash lamp can be moved into the correct position relative to the lens of the camera by rotating the unit. The rod-shaped member which is to unlock the percussion spring associated with said next flash lamp is then also in a suitable position relative to the camera. In this manner, all the lamps of the same series which is farthest remote from the camera can be flashed. When all the lamps of the said series have been flashed, the flash lamp unit is decoupled and connected again to the camera via the coupling member 42. Now the lamps 38 of the second series may be flashed.

FIG. 6 shows an embodiment in which each of the plates corresponding to plates 40, 41, of FIG. 5 accommodates a respective series of percussion flash lamps.

The rod-shaped members 63 again comprise two projections 64 and 65 each destined to unlock a respective percussion spring.

FIG. 7 shows a further modification of the flash lamp unit shown in FIG. 6. Plate 66 accommodates a first series of flash lamps 70 of which only two are shown. Plate 67 accommodates a second series of flash lamps 71. The tipped-off ends 72 of flash lamps 70 face the tipped-off ends 82 of flash lamps 71. Two coaxial flashlamps 70 and 71 cooperate with a common reflector member 73. The ends of the reflector member are provided with respective lugs 74 and 75. Said lugs are incorporated in apertures 76 and 77, respectively, of the two plates 66 and 67. At its ends, the reflector member comprises respective percussion edges 78 and 79, respectively. Each percussion edge is arranged to unlock a percussion spring associated with a flash lamp. Said flash lamp unit furthermore comprises two connection members 80 and 81. For the sequential firing of the flash lamps 70 of the first series, the unit is coupled to a camera by means of the connection member 81. A pin 90 emanating from the camera (not shown) will percuss against the reflector end 75 so that said reflector member is moved upwards as viewed in the Figure. The percussion edge 78 will, as a result, hit the locked part of percussion spring 91 associated with flash lamp 70 and will then unlock same. By rotating the unit, all the flash lamps of the first series may be ignited sequentially without it being necessary for the unit to be removed from the camera. For flashing the second series of lamps 71, the unit is connected to a camera by means of connection member 80.

FIGS. 9, 10 and 11 show an embodiment of a flash lamp unit which comprises flash lamps which can be ignited piezo-electrically. It comprises a box 100, a transparent cover 101, and connection members 102 and 103. A plate 104 having a printed wiring circuit is arranged in said box. Between the cover 101 and the plate 104 are arranged 8 piezo-electrically ignitable flash lamps 105 to 112 connected electrically to the circuit of the plate. Each lamp is placed in a reflector 113. The flash lamps are, for example of the type described in U.S. Pat. No. 3,501,254. The electric circuit may be of the type as described in U.S. Pat. No. 3,500,732. The plate 104 has two identical circuits, one of which serves for the coupling of the first series of lamps 105 to 108 and is connected when the connection member 103 is coupled electrically to suitable means in the camera. By sequentially applying a very high voltage for a short period of time, said lamps are sequentially fired. Via the connection member 102 the lamps 109 to 112 of the second series can be ignited piezo-electrically. In this embodiment, the lamps are arranged pairwise and with their longitudinal axes in one plane.

FIG. 11 shows a modification of the unit in which the lamps are oriented with their longitudinal direction transverse to the connection line 120 between the connection members 121 and 122. In this embodiment the lamps may be provided on an assembly plate as described which has smaller dimensions than the plate 104 of FIG. 10.

What is claimed is:

1. A flash lamp assembly comprising a housing, first and second opposed surfaces on said housing, first and second connection members which are respectively located on said opposing first and second surfaces of said housing, each connection member being suitable to be coupled to an associated camera, said assembly comprising first and second pluralities of flash lamps, said second plurality of flash lamps being disposed proximate to said first surface and said first plurality being disposed proximate to said second surface, said second connection member cooperating with only said second plurality of flash lamps and said first connection member cooperating only with said first plurality of flash lamps to ignite the lamps in said first and second pluralities respectively, said assembly cooperating with the associated camera to rotate about an axis of rotation, said assembly including a plurality of percussion springs, each lamp in said assembly being ignitable by an associated percussion spring locked in a tensioned position; and means to release a percussion spring cooperating with a lamp in said first plurality of lamps upon movement in a first axial direction and to release a spring cooperating with a lamp in said second plurality upon movement in a second axial direction, said means including a plurality of elongated members extending between said first and second connection members.

2. A flash lamp assembly as claimed in claim 1, wherein said elongated member is an elongated rod having at least two projections, said projections being positioned on said rod in such manner that, after unlocking a percussion spring associated with one series of lamps, the rod is in a suitable position for unlocking a percussion spring associated with the other series of flash lamps.

3. A flash lamp unit as claimed in claim 1 wherein each elongated movable member is formed as a part of a reflector, said movable part, after unlocking a percussion spring associated with one series of flash lamps, being in a position suitable for unlocking a percussion spring associated with the other series of flash lamps.

* * * * *